(12) United States Patent
Paolilli et al.

(10) Patent No.: US 9,227,381 B2
(45) Date of Patent: Jan. 5, 2016

(54) MULTILAYER BARRIER FILM HAVING COATING COMPOSITION WITH ORGANIC PARTICLES

(71) Applicants: Tracy Paolilli, East Greenwich, RI (US); John Fitch, Middletown, RI (US)

(72) Inventors: Tracy Paolilli, East Greenwich, RI (US); John Fitch, Middletown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

(21) Appl. No.: 13/756,332

(22) Filed: Jan. 31, 2013

(65) Prior Publication Data

US 2013/0143053 A1 Jun. 6, 2013

Related U.S. Application Data

(62) Division of application No. 12/983,019, filed on Dec. 31, 2010.

(60) Provisional application No. 61/390,479, filed on Oct. 6, 2010.

(51) Int. Cl.
| | | |
|---|---|---|
| *B32B 27/08* | (2006.01) | |
| *C08J 7/04* | (2006.01) | |
| *B05D 7/04* | (2006.01) | |
| *B32B 27/30* | (2006.01) | |
| *B32B 27/36* | (2006.01) | |
| *C09D 129/04* | (2006.01) | |
| *C08K 9/10* | (2006.01) | |
| *B05D 7/00* | (2006.01) | |

(52) U.S. Cl.
CPC . *B32B 27/08* (2013.01); *B05D 7/04* (2013.01); *B32B 27/308* (2013.01); *B32B 27/36* (2013.01); *C08J 7/042* (2013.01); *C09D 129/04* (2013.01); *B05D 7/544* (2013.01); *C08K 9/10* (2013.01); *Y10T 428/254* (2015.01); *Y10T 428/3192* (2015.04); *Y10T 428/31678* (2015.04); *Y10T 428/31786* (2015.04); *Y10T 428/31794* (2015.04); *Y10T 428/31855* (2015.04); *Y10T 428/31938* (2015.04)

(58) Field of Classification Search
CPC combination set(s) only.
See application file for complete search history.

(56) References Cited

U.S. PATENT DOCUMENTS

| | | | |
|---|---|---|---|
| 4,385,155 A | 5/1983 | Michaels | |
| 4,792,464 A | 12/1988 | Martenson | |
| 5,149,591 A | 9/1992 | Patitsas et al. | |
| 5,196,469 A * | 3/1993 | Cushing et al. | 524/300 |
| 5,482,767 A * | 1/1996 | Karagiannis et al. | 428/327 |
| 5,559,175 A | 9/1996 | Kroggel et al. | 524/297 |
| 5,595,818 A * | 1/1997 | Hopfe et al. | 428/327 |
| 5,981,029 A | 11/1999 | Harada et al. | |
| 6,599,622 B1 * | 7/2003 | Chu et al. | 428/323 |
| 6,641,463 B1 * | 11/2003 | Molnar | 451/41 |
| 7,303,797 B1 | 12/2007 | Barsotti et al. | |
| 7,473,729 B2 | 1/2009 | Feeney et al. | |
| 7,501,471 B2 | 3/2009 | Boylan | |
| 7,521,103 B2 | 4/2009 | Posey | |
| 7,737,200 B2 | 6/2010 | Jabar, Jr. et al. | |
| 9,145,476 B2 * | 9/2015 | Fuss | C08J 7/047 |
| 2003/0087114 A1 * | 5/2003 | Ferri et al. | 428/500 |
| 2003/0124365 A1 | 7/2003 | Posey et al. | |
| 2005/0123742 A1 * | 6/2005 | Flosenzier et al. | 264/638 |
| 2005/0196601 A1 | 9/2005 | Fitzgerald et al. | |
| 2005/0281866 A1 | 12/2005 | Jarrett et al. | |
| 2006/0099410 A1 | 5/2006 | Miller | |
| 2007/0004299 A1 * | 1/2007 | Fitch et al. | 442/59 |
| 2007/0036999 A1 * | 2/2007 | Rogers Agent et al. | 428/475.8 |
| 2007/0155879 A1 | 7/2007 | Osae et al. | |
| 2008/0160327 A1 * | 7/2008 | Knoerzer et al. | 428/457 |
| 2009/0098395 A1 | 4/2009 | Lu | |
| 2010/0167075 A1 * | 7/2010 | Mesa | 428/524 |
| 2010/0189944 A1 * | 7/2010 | Illsley et al. | 428/36.7 |
| 2010/0273012 A1 * | 10/2010 | Moriguchi et al. | 428/437 |

FOREIGN PATENT DOCUMENTS

| | | | |
|---|---|---|---|
| JP | 2000 238425 A | 9/2000 | |
| WO | WO 2009081877 A1 * | 7/2009 | |

* cited by examiner

*Primary Examiner* — Elizabeth A Robinson
*Assistant Examiner* — Daniel D Lowrey
(74) *Attorney, Agent, or Firm* — Jeffrey C. Lew

(57) ABSTRACT

A moisture vapor and oxygen transmission resistant flexible film has a polymeric base layer and a barrier layer of discrete particles of a first organic polymer dispersed throughout a matrix of a second organic polymer. Preferably, the first and second polymers are water insoluble and water soluble, respectively. The barrier layer is formed by depositing onto the base layer a coating composition of finely divided insoluble organic polymer particles suspended in an aqueous solution of the water soluble organic polymer, a crosslinking agent and surfactant. The coating composition is heated to crosslink the barrier layer polymers and evaporate solvent to provide a barrier film suitable for packaging applications. Optionally, the film can be metalized to increase barrier properties.

13 Claims, No Drawings

MULTILAYER BARRIER FILM HAVING COATING COMPOSITION WITH ORGANIC PARTICLES

FIELD OF THE INVENTION

This invention relates to an oxygen and moisture transmission resistant film for flexible substrates. More specifically, it relates to a composite of a polymeric base layer coated with a barrier layer having a discrete phase of organic polymeric fine particulates dispersed in an organic polymeric continuous phase. Preferably, the organic polymeric component of the discrete phase is water insoluble and the organic polymeric component of the continuous phase is water soluble.

TECHNICAL BACKGROUND OF THE INVENTION

In the food packaging and similar industries flexible films with barrier properties are used in large amounts to resist the transmission of water vapor and oxygen through the film. These barrier films typically have a base layer of a structurally strong material which is not very resistant to water vapor and oxygen transmission. Such films generally also include a barrier layer of a more water vapor and oxygen transmission resistant material.

Conventional barrier layers have a matrix phase of composition having an intrinsically high transmission resistance. To increase transmission resistance properties, a phase of discrete, fine particles are dispersed in the matrix phase. The dispersed phase particles are inorganic composition, such as clay, kaolin, vermiculite, silicates, and the like. It is generally understood that the dispersed phase particles are not particularly non-transmissive to water vapor and oxygen in and of themselves. However, they function to improve overall barrier film transmission resistance by providing discontinuities in the matrix and thus blocking the direct path of water and/or oxygen molecules migrating directly across the film. This causes such migrating molecules to take a tortuous, longer path which slows their flow from one side of the film to the other.

Use of inorganic particles in barrier films has certain drawbacks. Of some concern is an adverse effect observed in the process of making barrier films with an inorganic particle dispersed phase. The matrix phase is quite often a crosslinked polymeric composition of an intrinsically transmission resistant component. Polyvinyl alcohol (PVOH) and ethylene vinyl alcohol copolymer (EVOH) are preferred polymers. Usually the inorganic particles are dispersed in a liquid coating solution that is deposited onto the base layer and dried to form the barrier layer, A preferred solvent is water. A thermally activated crosslinking agent can be included to promote the crosslink reaction of the polymers which are dissolved substantially uncrosslinked in the solvent.

A problem arises when the inorganic particles are dispersed in the polymer matrix. A sharp rise in viscosity occurs at very low inorganic particle concentrations due to ionic charges that are inherent in inorganic mineral particles such as mica and vermiculite. This significant viscosity increase inhibits handling of the solution and the formation of a uniform and desirably thin barrier layer. High viscosity is particularly problematic when coating the wet barrier layer composition onto the base layer with gravure coating technology. There is a need to provide an effective moisture vapor and oxygen barrier transmission resistant coating and barrier film that does not suffer from excessive viscosity buildup using existing production equipment and process techniques.

U.S. Pat. No. 7,737,200 relates to a stable, aqueous barrier composition which comprises prolamine; cold water insoluble polymer; water; water-soluble co-solvent; and stabilizer. The composition, when applied to a substrate, produces an article having a high surface energy and resistance to oil and grease penetration.

U.S. Pat. No. 7,521,103 discloses a coating comprised of a first polymer reacted with a second polymer optionally using a crosslinker. For example, the first polymer may comprise a copolymer of polyvinyl alcohol and a vinylamine. The second polymer may comprise a copolymer of a maleic acid and an acrylic acid. The coating is present on the polymer film in an amount sufficient to increase the oxygen barrier properties of the film.

U.S. Pat. No. 7,501,471 describes a blend comprising a poly(vinyl alcohol) stabilized vinyl acetate-ethylene polymer emulsion and a paraffin wax emulsion. A dried coating of the blend on a substrate has a hydrostatic head barrier sufficient to prevent passage of fluids but allows passage of water vapor through it. The vinyl acetate-ethylene polymer emulsion comprises a polymer containing 70 to 95 wt % vinyl acetate and 5 to 30 wt % ethylene, based on the total weight of monomers in the polymer. The paraffin wax in the paraffin wax emulsion has an average particle size of at least 0.3 microns.

U.S. Pat. No. 7,473,729 describes an article comprising an acrylic nanocomposite film adhered to a substrate. The acrylic nanocomposite film comprises (a) a non-elastomeric acrylic polymer; and (b) an acid-treated, layered silicate filler material which has an aspect ratio of at least about 25.

U.S. Pat. No. 7,303,797 discloses a coating layer for increasing the gas barrier performance of rigid shaped containers and films. The coating layer includes a water-borne composition comprising a water-soluble or water dispersible organic binder in the optional presence of a cross-linking agent. The organic binder includes from 10% up to less than 90% by weight, based on the dry weight of the coating layer, of an inorganic laminar mineral selected from montmorillonite, laponite, organo-modified montmorillonite and mixtures thereof.

U.S. Pat. No. 5,981,029 describes a gas barrier film with a barrier coating. The film that provides high gas barrier ability at high humidity and under elongation, and also has durability of gas barrierability, and also with adhesiveness and post-lamination gas barrierability. The film is suggested for packaging material highly reliable in preservability. The barrier coating has inorganic stratified particles that may be provided by inorganic particles formed by overlapping one to several very thin unit crystal layers. Among them, especially, a clay is preferably used.

SUMMARY OF THE INVENTION

The present invention is a moisture vapor and oxygen transmission resistant flexible film that has a polymeric base layer and a barrier layer including discrete particles of a first organic polymer dispersed throughout a continuous matrix of a second organic polymer. The first and second organic polymers are water insoluble and water soluble, respectively. The barrier layer is formed by depositing onto the polymeric base layer a coating composition of finely divided insoluble organic polymer particles suspended in an aqueous solution of the water soluble organic polymer, a crosslinking agent and surfactant. The coating composition is heated to crosslink the barrier layer polymers and evaporate solvent so as to provide a barrier film suitable for packaging applications.

Accordingly, the present invention provides a coating composition comprising (i) about 1-25 wt. % of an organic polymer material comprising (a) about 1-99 wt. % of water insoluble organic polymer, and (b) a complementary amount to total 100 wt. % of a water soluble organic polymer, (ii) about 0.5-10 wt. % of a crosslinking agent, (iii) about 0-1 wt. % of a surfactant, and (iv) a complementary amount to total 100 wt. % of water, in which the water insoluble organic polymer is present in a form of finely divided particles suspended in a liquid solution of the water soluble organic polymer, crosslinking agent and surfactant dissolved in the water, and in which the crosslinking agent comprises a compound for crosslinking at least one of the water-insoluble organic polymer and the water soluble organic polymer.

There is also provided a barrier coating method for providing resistance to transmission of oxygen and moisture vapor formed by a process comprising the steps of (A) providing a coating composition comprising (i) about 1-25 wt. % of an organic polymer material comprising about 1-99 wt. % of water insoluble organic polymer and a complementary amount to total 100 wt. % of a water soluble organic polymer, ii) about 0.5-10 wt. % of a crosslinking agent, (iii) about 0-1 wt. % of a surfactant, and (iv) a complementary amount to total 100 wt. % of water, in which the water insoluble organic polymer is present in a form of finely divided particles suspended in a liquid solution of the water soluble organic polymer, crosslinking agent and surfactant dissolved in the water, and in which the crosslinking agent comprises a compound for crosslinking at least one of the water-insoluble organic polymer and the water soluble organic polymer, (B) heating the coating composition to a temperature in the range of about 50° C.-90° C. for a duration effective to substantially completely remove the water by evaporation and to crosslink at least one of the water insoluble organic polymer and the water soluble organic polymer, and (C) cooling the coating composition to ambient temperature.

There is further provided a multilayer barrier film having water vapor and oxygen transmission resistant properties, the multilayer barrier film comprising (1) a base layer of a polymer selected from the group consisting of polyester, polyolefin and a blend thereof, and (2) a barrier layer in direct contact with one side of the base layer and comprising (i) about 1-98.5 wt. % of water insoluble organic polymer, (ii) about 1-98.5 wt. % of a water soluble organic polymer, iii) about 0.5-10 wt. % of a crosslinking agent for crosslinking at least one of the water-insoluble organic polymer and the water soluble organic polymer, and (iv) about 0-1 wt. % of a surfactant, in which at least one of the water insoluble organic polymer and the water soluble organic polymer is substantially completely crosslinked by the crosslinking agent.

There is yet further provided a method of making a film having moisture and oxygen resistance comprising the steps of (A) providing a coating composition comprising (i) about 1-25 wt. % of an organic polymer material comprising about 1-99 wt. % of water insoluble organic polymer and a complementary amount to total 100 wt. % of a water soluble organic polymer, ii) about 0.5-10 wt. % of a crosslinking agent, (iii) about 0-1 wt. % of a surfactant water, and (iv) a complementary amount to total 100 wt. % of water, in which the water insoluble organic polymer is present in a form of finely divided particles suspended in a liquid solution of the water soluble organic polymer, crosslinking agent and surfactant dissolved in the water, and in which the crosslinking agent comprises a compound for crosslinking at least one of the water-insoluble organic polymer and the water soluble organic polymer, (B) providing a base film comprising a polymer selected from the group consisting of polyester, polyolefin and a blend thereof, (C) heating the coating composition to a temperature in the range of about 50-90° C., (D) depositing a layer of the coating composition onto one side of the base film, and (E) substantially completely removing the water from the coating composition and simultaneously crosslinking at least one of the water insoluble organic polymer and the water soluble organic polymer.

DETAILED DESCRIPTION OF THE INVENTION

This invention is a composition for use as an oxygen and moisture barrier layer coated on flexible substrates. Significantly advantageous barrier properties are obtained by the composition having the form of a discrete phase particles of a first organic polymer component dispersed in a continuous phase of a second organic polymer component. Typically the composition is deployed as a barrier layer on a structurally supportive base layer such that the barrier and base layer composite form a flexible, oxygen and moisture transmission resistant film. The film can be utilized in packaging applications either as a container for, or to wrap, moisture and/or oxygen sensitive products.

The film is preferably formed by depositing a liquid state, aqueous coating composition onto the base layer. The water of the coating composition is removed leaving the first and second organic polymer components. The dual phase structure of the barrier layer is achieved by utilizing for the first organic polymer component a water insoluble organic polymer in fine particle form and for the second organic polymer component a water soluble organic polymer. Thus the aqueous coating composition basically contains particles of the water insoluble organic polymer suspended in an aqueous solution of the water soluble organic polymer. Preferably the water insoluble organic polymer particles are uniformly dispersed throughout the aqueous solution.

The term "water soluble" means that the organic polymer has a solubility at an operative temperature in water of at least 1 wt. %, preferably at least 5 wt. % and more preferably at least 10 wt. %. The term and "water insoluble" means that the organic polymer has a solubility at an operative temperature in water of at most 1 wt. % preferably at most 0.5 wt. % and more preferably at most 0.1 wt. %. By "operative temperature" is meant the maximum temperature to which the coating composition is exposed before the water is removed.

In addition to the water soluble organic polymer, the aqueous solution can further comprise a crosslinking agent. The crosslinking agent is thermally active to cause the organic polymers of the barrier layer to crosslink. Crosslinking can occur in the water soluble organic polymer, the water insoluble organic polymer or both. Preferably crosslinking solidifies the matrix such that the discrete particles of water insoluble organic polymer are retained in fixed positions within the matrix. Crosslinking can also cause the dispersed particles and the matrix polymers to form an interpenetrating polymeric network. The crosslinker also aids in the formation of this network by reducing free volume within the matrix.

The crosslinking agent, for instance, may comprise a dialdehyde or a hydroxy acid. When using a hydroxy acid, the hydroxy acid may not only include a hydroxy group, but also may include a carboxylic acid group. A concentration of about 0.01-0.1 g/100 g of coating composition is preferred for effective crosslinking.

Types of the cross-linking agents suitable for use in this invention include melamine-based cross-linker, epoxy-based cross-linker, aziridine-based cross-linker, epoxyamide compounds, titanate-based coupling agents, e.g., titanium chelate, oxazoline-based cross-linker, isocyanate-based crosslinker, methylolurea or alkylolurea-based crosslinker, aldehyde-based crosslinker, acrylamide-based crosslinker and mixtures thereof. Dialdehyde crosslinking agent is preferred.

Representative aldehydes that can be used are include acetaldehyde, formaldehyde, propionaldehyde, glycolaldehyde, glyoxylic acid and the like or polyaldehydes, i.e., organic compounds having more than one aldehyde group in the compound, such as dialdehydes including glyoxal and glutaraldehyde, paraformaldehyde and the like. Preferred aldehyde crosslinkers are paraformaldehyde, formaldehyde, glyoxal, and glutaraldehyde. In one embodiment, the crosslinker may comprise epichlorohydrin.

The aqueous solution for the coating composition also optionally includes a surface active agent (i.e., surfactant). The surfactant helps to wet out the coating, i.e., form a uniform coating on the surface of the base layer when the wet coating composition is deposited. Ethoxylated surfactants are preferred.

Preferred water soluble organic polymers suitable for the matrix phase of the barrier layer are polyvinyl alcohol (PVOH), ethylene-vinyl alcohol copolymer (EVOH) or a blend thereof. Other water soluble organic polymers having good intrinsic moisture vapor and/or oxygen vapor transmission resistant properties can be used. Great preference is given to a water soluble recipe of a fully hydrolyzed EVOH and a partially hydrolyzed PVOH dissolved in water combined with an aldehyde-based crosslinker.

Representative examples of commercially available poly (ethylene vinyl alcohol) and polyvinyl alcohol that are suitable for use in this invention include. Kuraray RS-2117 Exceval® EVOH powder, Celanese Celvol® 103 fully hydrolyzed PVOH powder, Celanese Celvol® 24-203 partially hydrolyzed PVOH solution, Celanese Celvol 125 super hydrolyzed PVOH, Celanese Celvol 502 partially hydrolyzed PVOH, Mitsubishi Chemical Diafix® 631 copolymer and Celanese L12 vinyl alcohol-vinylamine copolymer.

Kuraray RS-2117 Exceval® EVOH powder is fully hydrolyzed; viscosity of 4% aqueous solution at 20° C. 23.0-30.0 mPa-sec as measured by Brookfield synchronized rotary-type viscometer per DIN 53015; degree of hydrolysis 97.5-99.0 mol %; maximum ash content (as $Na_2O$) 0.4%; maximum volatile content (after 3 hours drying at 105° C.) of 5.0% with methanol content less than 3%; weight average molecular weight MWw ca. 130,000 g/mol, number average molecular weight MWn ca. 53,000 g/mol, MWw/MWn ca. 2.4-2.5 via GPC measurement. Molecular weight range 80-130 Kg/mol.

Celanese Celvol® 103 fully hydrolyzed PVOH powder is 98.0-98.8 mol % hydrolysis, 4 wt % solids solution viscosity 4.00+/−0.50 cP, total volatiles 5.00 wt % maximum, methanol maximum 0.90 wt %, ash maximum 1.20 wt %, and 4 wt % solution pH 6.00+/−1.00.

Celanese Celvol® 24-203 partially hydrolyzed PVOH is a solution at 23% wt non-volatile solids (NVS), 88.00+/−1.00 mol-% hydrolysis, 4 wt % solids solution viscosity 4.00+/−0.50 cP, total volatiles 5.00 wt % maximum, methanol maximum 0.90 wt %, ash maximum 0.90 wt %, and 4 wt % solution pH 5.50+/−1.00).

Celanese Celvol 125 super hydrolyzed PVOH is 99.65+/−0.35 mol-% hydrolyzed, 4 wt % solids solution with viscosity of 30.00+/−2.00 cP, total volatiles 5.00 wt % maximum, methanol maximum 0.90 wt %, ash maximum 1.20 wt %, and 4 wt % solution pH 6.50+/−1.00.

Celanese Celvol 502 partially hydrolyzed PVOH is 88.00+/−1.00 mol-% hydrolyized, 4 wt % solids solution viscosity 3.35+/−0.35 cP and molecular weight range 85 to 124 g/mol.

Mitsubishi Chemical Diafix® 631 vinyl alcohol-vinylamine copolymer is 87.0 mol % vinyl alcohol, 13.0 mol % vinyl amine, viscosity at 30° C. (4% aqueous solution) 15.2 mPa-s, pH (4% aqueous solution) 10.8.

Celanese L12 vinyl alcohol-vinylamine copolymer is 12 mol % vinyl amine, 88 mol % vinyl alcohol, amine content 2.3-2.6 meq $NH_2$/gram, average $M_w$ 10,000-20,000, viscosity at 20° C. (4% aqueous solution) 5-10 cps, pH (4% aqueous solution) 9-12, Tg (powder) 85-100° C., melting point (powder) 180-220° C.

The water insoluble organic polymer should be at least moderately chemically compatible with the water soluble organic polymer and preferably is in the same chemical family. Polyvinyl butyral (PVB) is the preferred water insoluble organic polymer for the dispersed phase of the barrier layer in which the water soluble organic polymer is PVOH and/or EVOH. PVB is a polyvinyl acetal which can be produced by the reaction of PVOH with n-butyraldehyde. Commercial PVB as may be used in this invention can contain a significant amount of unreacted hydroxyl groups which are available for crosslinking and interpenetrating network formation. Preferably, the weight average molecular weight is from about 50 to 250 Kg/mole, $T_g$ is about 62-78° C., and hydroxyl group concentration is about 1-10%.

Representative examples of commercially available PVB suitable for use in this invention are Kuraray B20H and Kuraray B60H Mowital® polyvinylbutyral powder. Kuraray B20H Mowital® polyvinylbutyral powder is 1-4% polyvinyl acetate, viscosity of 10% solution at 20° C. 20-30 mPa·s as measured by Brookfield synchronized rotary-type viscometer per DIN 53015. Kuraray B60H Mowital® polyvinylbutyral powder is 1-4% polyvinyl acetate, viscosity of 10% solution at 20° C. 160-260 mPa·s as measured by Brookfield synchronized rotary-type viscometer per DIN 53015.

The water soluble organic polymer and other soluble components are dissolved in water to desired concentration using conventional methods for dissolving solid solutes in liquid solvents. The water insoluble organic polymer component is comminuted to a fine particle size (i.e., less than 500 micrometers nominal dimension, preferably less than 250 micrometers) and then can be dispersed into the aqueous solution. Alternatively an aqueous dispersion of the water insoluble organic polymer can be mixed with a stock solution of soluble components to obtain the coating composition. Once the water insoluble organic polymer is added to the solution, the particles are kept suspended in the liquid by mild agitation to avoid settling. By way of example, PVB is available from Solutia Inc. or Kuraray America Inc. in a particle size range of about 150-250 μm. This material can be ground using an Eiger mill with a ceramic chamber in a PVOH medium to reduce the particle size to mean average of about 25 μm which is then dispersed into the aqueous coating solution.

The base layer is composed of a synthetic polymer. Linear partially aromatic polyesters such as polyethylene terephthalate (PET), polyhydroxy acid polymers such as polylactic acid (PLA) and polyolefins, such as polypropylene are preferred. Polyhydroxy acid composition is useful in applications demanding a biodegradable barrier film. The base layer may be a mono- or biaxially oriented film.

The wet barrier layer coating composition is deposited on the base layer using conventional techniques, such as dip coating, roller coating, spraying, doctoring, painting and the like. Preference is given to coating by gravure printing. The liquid coating composition of this invention does not increase in viscosity when heated for crosslinking during application. Thus it is very useful for gravure processing which suffers if viscosity gets too high. Additionally, because viscosity remains low, greater amounts of water insoluble organic polymer can be dispersed into the matrix than would function with conventional inorganic dispersed phase materials. Barrier properties generally increase as concentration of dispersed phase in the matrix increases. Thus while keeping viscosity manageable, higher solids content of the present invention should also provide better moisture vapor and oxygen transmission resistance.

An inorganic layer can be optionally added to the multilayer barrier film for end use applications that demand greater barrier properties. The inorganic layer can be a metal or non-metal composition such as copper, aluminum, aluminum oxide, silicon oxide to name a few representative examples. The inorganic layer is applied to the side of the barrier layer opposite the base layer. The inorganic layer can be a foil laminated to the barrier layer although depositing extremely thin layers by such techniques as chemical vapor deposition, vacuum metalization and sputtering are preferred. When an inorganic layer is included, it is also contemplated that the organic polymer nature of the dispersed as well as matrix phase of the barrier layer will permit improved metal adhesion.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. The term "NVS" in this disclosure means nonvolatile solids and represents the concentration of the component in a solution.

Example 1

An offline gravure ("O.G.") procedure was used to coat a 17.5 μm thick biaxially oriented polypropylene ("BOPP") base layer film with a multilayer barrier composite. In accord with the O.G. procedure, the base layer film was cast from a melt in thin, sheet form, stretched and oriented in a separate operation prior to applying coating compositions. A dilute aqueous solution of polyethyleneimine (PEI) was prepared and fed to a gravure roll applicator. The film was fed into a nip between the gravure roll and rubber backing roll. The gravure cell volume determines thickness of the liquid applied to the film. After applying the solution, the water was removed by oven drying so as to leave a primer coat of PEI on the base layer film. The solution was applied by the gravure roll at a rate effective to deposit a 0.41 g/m$^2$ thickness of PEI after the water was removed.

A mixture of 2.59% NVS Kuraray RS2117 Exceval® fully hydrolyzed EVOH powder, 5.38% NVS Celanese Celvol® 502 partially hydrolyzed polyvinyl alcohol, 0.8% NVS glyoxal dialdehyde and 0.048% NVS Air Products Surfynol 420 defoaming agent/surfactant was dissolved in water. The surfactant was a 2.6:1 ratio of (a) ethoxylated 2,4,7,9-tetramethyl 5 decyn-4,7-diol:(b) 2,4,7,9-tetramethyl-5-decyne-4,7-diol. Other characteristics of this surfactant include having ethylene oxide content 1.3 mol % or 20 wt %, specific gravity at 25° C. of 0.943, pH (1% aqueous solution) 6-8, viscosity at 20° C. less than 250 cps, hydrophile-lipophile balance 4, and volatile organic compound (VOC, EPA method 24) 28 wt %. To this solution was added particles of muscovite mica 0.18% NVS and acetylated high molecular weight polyvinyl butyral (PVB) 0.39% NVS. The mica and PVB particles were dispersed in the liquid phase solution at 22° C. The dispersion was fed to a gravure roll applicator system and deposited onto the primer layer at a rate effective to provide a dry weight barrier layer of 0.36 g/m$^2$. Water of the barrier layer solution was removed by heating the coated film in an oven, thereby leaving a dry coating of primer layer and barrier layer on the base layer film.

The barrier layer film was analyzed for oxygen transmission rate (OTR) and moisture vapor transmission rate (MVTR). The OTR and MVTR analytical methods for these experiments were ASTM D3985 and ASTM F1249, respectively. The OTR of the Ex. 1 coated film was 0.119 cc/100 cm$^2$/day and the MVTR was 15.5 mg/100 cm$^2$/day. Table 1 presents summaries of the operating variables and the analytical results for this and other operative examples of this disclosure.

Comparative Example 1

The procedure of Ex. 1 was repeated except that no primer layer, and no particles were used in the barrier layer. Despite more than doubling the weight of the barrier layer to 0.78 g/m$^2$, MVTR was the same as Ex. 1 and OTR increased by 63% to 0.194 cc/100 cm$^2$/day. Table 2 presents a summary of the operating variables and the analytical results for this and other comparative examples of this disclosure.

Example 2

The procedure of Ex. 1 was repeated except that the barrier layer particles consisted of 0.73% NVS of the PVB without mica and the barrier layer dry weight was slightly reduced to 0.29 g/m$^2$. Also, the barrier layer coating composition was mixed at 49° C. Both MVTR and OTR were lower by more than 9% relative to Ex. 1.

Comparative Example 2

The procedure of Ex. 1 was repeated except that there was no PVB in the barrier layer. OTR of this film was comparable to that of Ex. 1, however, the MVTR at 17.0 mg/100 cm$^2$/day was about 9% higher Examples 3 and 4

Procedures of Exs. 1 and 2 were repeated, respectively, except that a third, cover layer was applied by gravure roll coating onto the barrier layer. The cover layers had compositions identical to the barrier layers but were free of dispersed particles. Cover layer dry weight was 0.29 g/m$^2$ in each of these examples. MVTR results were the same as Exs. 1 and 2, however, OTR dropped to 0.0465 cc/100 cm$^2$/day in both Ex. 3 and Ex. 4.

Comparative Examples 3 and 4

The procedure of Exs. 3 and 4 was repeated, respectively except that the barrier layer contained no PVB particles in Comp. Ex. 3 and no particles at all in Comp. Ex. 4. Barrier properties of Comp. Ex. 3 were similar to those of Ex. 3. It is noted that the coating liquid was prepared and maintained at room temperature during these trials. In commercial scale production there are advantages to raising the coating liquid temperature after mixing the coating components in water and before the liquid is coated onto the base layer. For example, elevating the coating liquid temperature early in the coat application process can lower viscosity of coating fluid for easier handling and application to the base layer. It can accelerate activation of the crosslinker and can also facilitate evaporation of water from the wet film in high temperature ovens by reducing the incremental amount of sensible heat needed by the ovens to vaporize coating liquid water. Examples such as Ex. 1, Ex. 3 and Comp. Ex. 3 include an inorganic particulate component in the barrier layer coating liquid composition. Inorganic particles such as clay in the present examples, are known to swell and otherwise increase viscosity of the dispersion when it is heated. The significant productivity advantages of using organic particulates which do not increase viscosity of the heated coating liquid offsets any slight comparative decrease in transfer properties observed.

OTR and MVTR of Comp. Ex. 4 were both higher than Ex. 4 further illustrating the improvement derived from having exclusively organic PVB particles in the barrier layer.

Example 5

The procedure of Ex. 4 was repeated except that the continuous phase composition of the barrier layer consisted of 4% NVS of Celanese Celvol® 103 fully hydrolyzed PVOH powder 3% NVS Mitsubishi Chemical Diafix® 631 ethylene diamine and Celanese L12 vinyl alcohol-vinylamine copolymer. Also, PVB particles in the barrier layer were reduced to 0.07% NVS and no surfactant was used in the barrier layer. OTR of the barrier layer film was 0.0728 cc/100 cm$^2$/day and MVTR was 15.5 mg/100 cm$^2$/day.

Examples 6-10

An inline gravure ("I.G.") procedure was used to coat a 17.5 μm thick biaxially oriented polypropylene ("BOPP") base layer film with a barrier layer. In accord with the I.G. procedure, the base layer film composition was continuously cast from a melt in thin sheet form and stretched in the machine direction to obtain thin film form by conventional methods. The film was then fed into a nip between a gravure roll and rubber backing roll. A mixture of 5.5% NVS Kuraray RS2117 Exceval® fully hydrolyzed EVOH powder, 9.4% NVS Celanese Celvol® 502 partially hydrolyzed polyvinyl alcohol, 1.6% NVS glyoxal dialdehyde and 0.11% NVS Surfynol 420 defoaming agent/surfactant was dissolved in water. In Exs. 6-10 two types of PVB particles were dispersed in this solution in concentrations from 0.025% NVS to 0.2% NVS at 22° C. Each dispersion was fed to a gravure roll applicator system and deposited onto the base layer at a rate effective to provide a dry weight barrier layer of 0.82 g/m$^2$. The wet-coated base layer film continued in the machine direction into a tenter. There the film was stretched in the transverse direction to a preselected stretch ratio. The film was then heated to simultaneously dry water from the coating, activate the crosslinker, and orient the stretched film.

On the dry barrier coated films was placed a thin layer of aluminum by conventional vacuum deposition. The aluminum was applied to a thickness equivalent to optical density of 3.9. The samples were analyzed for OTR and MVTR.

Comparative Examples 5-11

In Comparative Examples 5-7 the procedure of Ex. 6 was repeated except that silicon microsphere particles were substituted for PVB particles. From these experiments it is seen that the aluminum layer significantly reduced the OTR and MVTR values by about an order of magnitude relative to equivalent non-metalized samples. With respect to Comp. Ex. 6, OTR was somewhat improved relative to equivalently met-alized Ex. 6, however, MVTR increased by 72% to 1.98 mg/100 cm$^2$/day. Similarly the procedure of Ex. 7 was repeated in Comparative Example 7, except that 0.1% NVS of silicon microspheres was substituted for 0.15% NVS PVB. The amount of inorganic particles in Comp. Ex 7 was lower than the concentration of organic particles in Ex. 7. However, both OTR and MVTR increased substantially in these comparative examples showing that organic particles in the barrier layer were highly effective for creating a transmission barrier.

Comparative Examples 8-10 repeated the procedure of Comp. Ex. 6 except that 120 μm super hydrolyzed polyvinyl alcohol particles were substituted for the silicon microsphere particles. The super hydrolyzed PVOH particles are water insoluble at the barrier layer composition dispersion temperature of these examples but are water soluble at higher temperatures. At low % NVS composition poor MVTR was obtained relative to Ex. 6. At 0.2% NVS particle concentration the PVB-containing barrier had better MVTR. As mentioned, at commercial scale, the barrier coating liquid would be heated to temperatures at which these hydrolyzed PVOH particles would dissolve in water. Under such conditions, it is expected that there would not be discrete particles in the barrier layer. Consequently the barrier effect of solid phase particles dispersed in a continuous phase matrix would not occur in contemplated full scale operation of these comparative example formulations.

For Comparative Example 11, the procedure of Comp. Ex. 6 was repeated except that no particles were included in the barrier layer composition. OTR and MVTR results were significantly higher than those of Comp. Exs. 5 and 8 and thus further demonstrate the improvement derived by using PVB particles seen in Exs. 6-10.

Examples 11 and 12

Fabricate a series of polymeric barrier films similar in structure to those of Exs. 6-10 but with the following differences. Use a 17.5 μm thickness base layer of biaxially oriented polylactic acid (BOPLA). Coat the base layer with a liquid barrier layer composition using an offline Mayer rod coating technique.

In offline Mayer rod coating the base layer film is formed by casting from a melt and stretching in the machine and transverse directions, orienting and setting by exposure to heat. After film formation, the base layer film can be wound up and stored for later coating. As appropriate, the base layer film fabricated earlier in a separate operation is unwound and passed into a Mayer rod coating station. A coating liquid composition is prepared and placed in a trough. A Mayer rod disposed horizontally rotates about the rod axis above the trough at a level such that the rod is partially submerged in the liquid. The Mayer rod is a mandrel having wire wound circumferentially around it. The rod picks up liquid in the grooves between adjacent wire arcs. The film being coated is drawn in contact with the rotating rod oriented transverse to the draw direction. The rod deposits a wet coating of liquid onto a side of the film. Dry weight of the coating formed on the base layer depends upon the Mayer rod winding wire size and the solids concentration of the coating liquid. After the liquid is transferred to the film, it passes into a drying oven to remove water and thereby leave a dry coating on the film.

In these examples prepare an aqueous solution of 2.25% NVS NVS Kuraray RS2117 Exceval® fully hydrolyzed EVOH powder, 4.7% NVS Celanese Celvol® 502 partially hydrolyzed polyvinyl alcohol, 0.8% NVS glyoxal dialdehyde and 0.055% NVS Surfynol 420 defoaming agent/surfactant.

To this solution add particles of acetylated, high molecular weight PVB in amounts of 0.2% NVS and 1% NVS, for Exs. 11 and 12, respectively. Mix the particle-bearing solution at 22° C. to uniformly disperse the particles. Feed the dispersion of particles in solution to the trough of the Mayer rod coating system and deposit on the base layer film a wet coating of barrier layer composition effective to produce dry weight of 0.86 g/m². Heat the wet-coated base layer film in an oven to remove water of solution and activate the crosslinking agent. On the dry barrier coated films place a thin layer of aluminum equivalent to optical density of 3.4 by conventional vacuum deposition. The metalized barrier films have respective MVTR values of 5.58 mg/100 cm²/day and 3.56 mg/100 cm²/day as shown in Table 1. Thus the moisture barrier effectiveness improves as the amount of PVB particles in the barrier layer increases.

Comparative Example 12

Repeat the procedure of Ex. 11 except do not add organic polymer particles to the barrier layer. The MVTR of the metalized barrier film is 7.4 mg/100 cm²/day.

Crosslinkers used in the examples are epichlorohydrin Hercules Polycup 172 polyamide-epichlorohydrin crosslinker of 12-12.5% wt NVS, viscosity at 25° C. 25-75 cps, pH 4.0-5.5, specific gravity at 21° C. 1.03 dialdehyde Emerald Performance Materials Freechem® 40 DL which is a glyoxal (ethanedial) of 40% wt NVS, less than 0.8 wt % residual acid, pH of 3.0, and specific gravity 1.270 (40% solids aqueous solution), boiling point 110° C. (40% solids aqueous solution), melting point 15° C. (crystals or dry powder).

Codes used in the tables are as follows:
Particles No. 1=purified Montmorillonite
Particles No. 2=2 μm silicon resin microspheres
Particles No. 3=Muscovite Mica
Particles No. 4=>120 μm super hydrolyzed PVOH (water insoluble at room temperature)
Particles No. 5=acetylated, high molecular weight PVB
Particles No. 6=PVB B-79
Particles No. 7=highly acetylated, low molecular weight PVB
Surfactant=2.6:1 ratio (a) ethoxylated 2,4,7,9-tetramethyl 5 decyn-4,7-diol:(b) 2,4,7,9-tetramethyl-5-decyne-4,7-diol
PEI=polyethyleneimine Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. The entire disclosures of U.S. patents and patent applications named in this disclosure are hereby incorporated by reference herein.

TABLE 1

|  | Ex 1 | Ex 2 | Ex 3 | Ex 4 | Ex 5 | Ex 6 | Ex 7 |
|---|---|---|---|---|---|---|---|
| Base Layer Composition | BOPP | BOPP | BOPP | BOPP | BOPP | BOPP | BOPP |
| Base Layer Thickness (μm) | 17.5 | 17.5 | 17.5 | 17.5 | 17.5 | 17.5 | 17.5 |
| Coating Method | O.G. | O.G. | O.G. | O.G. | O.G. | I.G. | I.G. |
| Primer layer | | | | | | | |
| Primer Layer Composition | PEI | PEI | PEI | PEI | | | |
| Primer Layer dry weight (g/m²) | 0.41 | 0.41 | 0.41 | 0.41 | | | |
| Barrier layer | | | | | | | |
| Water Soluble Component (wt % NVS) | | | | | | | |
| fully hydrolyzed EVOH | 2.59 | 2.59 | 2.59 | 2.59 | | 5.5 | 5.5 |
| partially hydrolyzed PVOH | 5.38 | 5.38 | 5.38 | 5.38 | | 9.4 | 9.4 |
| fully hydrolyzed PVOH | | | | | 4 | | |
| ethylene diamine | | | | | 3 | | |
| Water Insoluble Component (wt % NVS) | | | | | | | |
| Particles No. 1 | | | | | | | |
| Particles No. 2 | | | | | | | |
| Particles No. 3 | 0.18 | | 0.18 | | | | |
| Particles No. 4 | | | | | | | |
| Particles No. 5 | 0.39 | 0.73 | 0.39 | 0.73 | 0.07 | | |
| Particles No. 6 | | | | | | 0.05 | 0.15 |
| Particles No. 7 | | | | | | | |
| Crosslinking Agent (wt % NVS) | | | | | | | |
| Glyoxal | 0.8 | 0.8 | 0.8 | 0.8 | | 1.6 | 1.6 |
| Epichlorohydrin | | | | | 0.24 | | |
| Surfactant (wt % NVS) | 0.048 | 0.048 | 0.048 | 0.048 | 0 | 0.11 | 0.11 |
| Barrier Layer dry weight (g/m²) | 0.36 | 0.29 | 0.36 | 0.29 | 0.42 | 0.82 | 0.82 |
| Barrier Coating Application Temperature (° C.) | 22 | 49 | 22 | 49 | 22 | 22 | 22 |
| Cover layer | | | | | | | |
| Water Soluble Component (wt % NVS) | | | | | | | |
| fully hydrolyzed EVOH | | | 2.59 | 2.59 | 2.59 | | |
| partially hydrolyzed PVOH | | | 5.38 | 5.38 | 5.38 | | |
| Water Insoluble Component (wt % NVS) | | | | | | | |
| Particles No. 5 | | | | | 0.73 | | |
| Crosslinking Agent (wt % NVS) | | | | | | | |
| Glyoxal (wt %) | | | 0.8 | 0.8 | 0.8 | | |
| Surfactant (wt % NVS) | | | 0.048 | 0.048 | 0.048 | | |

TABLE 1-continued

|  |  |  |  |  |  |  |
|---|---|---|---|---|---|---|
| Cover Layer dry weight (g/m2) |  |  | 0.29 | 0.29 | 0.31 |  |  |
| Cover Coating Application Temperature (° C.) |  |  | 49 | 49 | 49 |  |  |
| Aluminum Deposition Method | none | none | none | none | none | Vacuum | Vacuum |
| Aluminum Thickness (optical density) | 0 | 0 | 0 | 0 | 0 | 3.9 | 3.9 |
| OTR cc/100 cm$^2$/day | 0.119 | 0.108 | 0.0465 | 0.0465 | 0.0728 | 0.00486 | 0.00308 |
| MVTR mg/100 cm$^2$/day | 15.5 | 14.0 | 14.0 | 14.0 | 15.5 | 1.15 | 1.37 |

|  | Ex 8 | Ex 9 | Ex 10 | Ex 11 | Ex 12 |
|---|---|---|---|---|---|
| Base Layer Composition | BOPP | BOPP | BOPP | BOPLA | BOPLA |
| Base Layer Thickness (μm) | 17.5 | 17.5 | 17.5 | 17.5 | 17.5 |
| Coating Method | I.G. | I.G. | I.G. | O.R. | O.R. |
| Primer layer |  |  |  |  |  |
| Primer Layer Composition |  |  |  |  |  |
| Primer Layer dry weight (g/m$^2$) |  |  |  |  |  |
| Barrier layer |  |  |  |  |  |
| Water Soluble Component (wt % NVS) |  |  |  |  |  |
| fully hydrolyzed EVOH | 5.5 | 5.5 | 5.5 | 2.25 | 2.25 |
| partially hydrolyzed PVOH | 9.4 | 9.4 | 9.4 | 4.7 | 4.7 |
| fully hydrolyzed PVOH |  |  |  |  |  |
| ethylene diamine |  |  |  |  |  |
| Water Insoluble Component (wt % NVS) |  |  |  |  |  |
| Particles No. 1 |  |  |  |  |  |
| Particles No. 2 |  |  |  |  |  |
| Particles No. 3 |  |  |  |  |  |
| Particles No. 4 |  |  |  |  |  |
| Particles No. 5 |  |  |  | 0.2 | 1 |
| Particles No. 6 |  |  |  |  |  |
| Particles No. 7 | 0.025 | 0.1 | 0.2 |  |  |
| Crosslinking Agent (wt % NVS) |  |  |  |  |  |
| Glyoxal | 1.6 | 1.6 | 1.6 | 0.8 | 0.8 |
| Epichlorohydrin |  |  |  |  |  |
| Surfactant (wt % NVS) | 0.11 | 0.11 | 0.11 | 0.055 | 0.055 |
| Barrier Layer dry weight (g/m$^2$) | 0.82 | 0.82 | 0.82 | 0.86 | 0.86 |
| Barrier Coating Application Temperature (° C.) | 22 | 22 | 22 | 22 | 60 |
| Cover layer |  |  |  |  |  |
| Water Soluble Component (wt % NVS) |  |  |  |  |  |
| fully hydrolyzed EVOH |  |  |  |  |  |
| partially hydrolyzed PVOH |  |  |  |  |  |
| Water Insoluble Component (wt % NVS) |  |  |  |  |  |
| Particles No. 5 |  |  |  |  |  |
| Crosslinking Agent (wt % NVS) |  |  |  |  |  |
| Glyoxal (wt %) |  |  |  |  |  |
| Surfactant (wt % NVS) |  |  |  |  |  |
| Cover Layer dry weight (g/m2) |  |  |  |  |  |
| Cover Coating Application Temperature (° C.) |  |  |  |  |  |
| Aluminum Deposition Method | Vacuum | Vacuum | Vacuum | Bell | Bell |
| Aluminum Thickness (optical density) | 3.9 | 3.9 | 3.9 | 3.4 | 3.4 |
| OTR cc/100 cm$^2$/day | 0.00308 | 0.00308 | 0.00386 | not tested | not tested |
| MVTR mg/100 cm$^2$/day | 0.901 | 1.22 | 1.01 | 5.58 | 3.56 |

TABLE 2

|  | Comp Ex 1 | Comp Ex 2 | Comp Ex 3 | Comp Ex 4 | Comp Ex 5 | Comp Ex 6 |
|---|---|---|---|---|---|---|
| Base Layer Composition | BOPP | BOPP | BOPP | BOPP | BOPP | BOPP |
| Base Layer Thickness (μm) | 17.5 | 17.5 | 17.5 | 17.5 | 17.5 | 17.5 |
| Coating Method | O.G. | O.G. | O.G. | O.G. | I.G. | I.G. |
| Primer layer |  |  |  |  |  |  |
| Primer Layer Composition |  | PEI | PEI | PEI |  |  |
| Primer Layer dry weight (g/m$^2$) |  | 0.41 | 0.41 | 0.41 |  |  |
| Barrier layer |  |  |  |  |  |  |
| Water Soluble Component (wt % NVS) |  |  |  |  |  |  |
| fully hydrolyzed EVOH | 2.59 | 2.59 | 2.59 | 2.59 | 5.5 | 5.5 |
| partially hydrolyzed PVOH | 5.38 | 5.38 | 5.38 | 5.38 | 9.4 | 9.4 |
| fully hydrolyzed PVOH |  |  |  |  |  |  |
| ethylene diamine |  |  |  |  |  |  |

TABLE 2-continued

| | | | | | | |
|---|---|---|---|---|---|---|
| Water Insoluble Component (wt % NVS) | | | | | | |
| Particles No. 1 | | 0.18 | 0.18 | | | |
| Particles No. 2 | | | | | 0.01 | 0.05 |
| Particles No. 3 | | | | | | |
| Particles No. 4 | | | | | | |
| Particles No. 5 | | | | | | |
| Particles No. 6 | | | | | | |
| Particles No. 7 | | | | | | |
| Crosslinking Agent (wt % NVS) | | | | | | |
| Glyoxal | 0.8 | 0.8 | 0.8 | 0.8 | 1.6 | 1.6 |
| Epichlorohydrin | | | | | | |
| Surfactant (wt % NVS) | 0.048 | 0.048 | 0.048 | 0.048 | 0.11 | 0.11 |
| Barrier Layer dry weight (g/m$^2$) | 0.78 | 0.36 | 0.26 | 0.36 | 0.82 | 0.82 |
| Barrier Coating Application Temperature (° C.) | 49 | 22 | 22 | 22 | 22 | 22 |
| Cover layer | | | | | | |
| Water Soluble Component (wt % NVS) | | | | | | |
| fully hydrolyzed EVOH | | | 2.59 | 2.59 | | |
| partially hydrolyzed PVOH | | | 5.38 | 5.38 | | |
| Water Insoluble Component (wt % NVS) | | | | | | |
| Particles No. 5 | | | | | | |
| Crosslinking Agent (wt % NVS) | | | | | | |
| Glyoxal (wt %) | | | 0.8 | 0.8 | | |
| Surfactant (wt % NVS) | | | 0.048 | 0.048 | | |
| Cover Layer dry weight (g/m2) | | | 0.36 | 0.36 | | |
| Cover Coating Application Temperature (° C.) | | | 49 | 49 | | |
| Aluminum Deposition Method | none | none | none | none | Vacuum | Vacuum |
| Aluminum Thickness (optical density) | 0 | 0 | 0 | 0 | 3.9 | 3.9 |
| OTR cc/100 cm$^2$/day | 0.194 | 0.118 | 0.0356 | 0.0741 | 0.00327 | 0.00277 |
| MVTR mg/100 cm$^2$/day | 15.5 | 17.0 | 14.0 | 15.5 | 1.2 | 1.98 |

| | Comp Ex 7 | Comp Ex 8 | Comp Ex 9 | Comp Ex 10 | Comp Ex 11 | Comp Ex 12 |
|---|---|---|---|---|---|---|
| Base Layer Composition | BOPP | BOPP | BOPP | BOPP | BOPP | BOPLA |
| Base Layer Thickness (μm) | 17.5 | 17.5 | 17.5 | 17.5 | 17.5 | 20 |
| Coating Method | I.G. | I.G. | I.G. | I.G. | I.G. | O.R. |
| Primer layer | | | | | | |
| Primer Layer Composition | | | | | | |
| Primer Layer dry weight (g/m$^2$) | | | | | | |
| Barrier layer | | | | | | |
| Water Soluble Component (wt % NVS) | | | | | | |
| fully hydrolyzed EVOH | 5.5 | 5.5 | 5.5 | 5.5 | 5.5 | 2.25 |
| partially hydrolyzed PVOH | 9.4 | 9.4 | 9.4 | 9.4 | 9.4 | 4.7 |
| fully hydrolyzed PVOH | | | | | | |
| ethylene diamine | | | | | | |
| Water Insoluble Component (wt % NVS) | | | | | | |
| Particles No. 1 | | | | | | |
| Particles No. 2 | | 0.1 | | | | |
| Particles No. 3 | | | | | | |
| Particles No. 4 | | | 0.05 | 0.15 | 0.2 | |
| Particles No. 5 | | | | | | |
| Particles No. 6 | | | | | | |
| Particles No. 7 | | | | | | |
| Crosslinking Agent (wt % NVS) | | | | | | |
| Glyoxal | 1.6 | 1.6 | 1.6 | 1.6 | 1.6 | 0.8 |
| Epichlorohydrin | | | | | | |
| Surfactant (wt % NVS) | 0.11 | 0.11 | 0.11 | 0.11 | 0.11 | 0.055 |
| Barrier Layer dry weight (g/m$^2$) | 0.82 | 0.82 | 0.82 | 0.82 | 0.82 | 0.86 |
| Barrier Coating Application Temperature (° C.) | 22 | 22 | 22 | 22 | 22 | 22 |
| Cover layer | | | | | | |
| Water Soluble Component (wt % NVS) | | | | | | |
| fully hydrolyzed EVOH | | | | | | |
| partially hydrolyzed PVOH | | | | | | |
| Water Insoluble Component (wt % NVS) | | | | | | |
| Particles No. 5 | | | | | | |
| Crosslinking Agent (wt % NVS) | | | | | | |
| Glyoxal (wt %) | | | | | | |
| Surfactant (wt % NVS) | | | | | | |

TABLE 2-continued

| | | | | | | |
|---|---|---|---|---|---|---|
| Cover Layer dry weight (g/m2) | | | | | | |
| Cover Coating Application Temperature (° C.) | | | | | | |
| Aluminum Deposition Method | Vacuum | Vacuum | Vacuum | Vacuum | Vacuum | Bell |
| Aluminum Thickness (optical density) | 3.9 | 3.9 | 3.9 | 3.9 | 3.9 | 3.4 |
| OTR cc/100 cm$^2$/day | 0.00644 | 0.00287 | 0.00387 | 0.00337 | 0.00496 | not tested |
| MVTR mg/100 cm$^2$/day | 4.22 | 1.98 | 1.0 | 1.22 | 2.78 | 7.44 |

What is claimed is:

1. A multilayer barrier film having water vapor and oxygen transmission resistant properties, the multilayer barrier film comprising (1) a polymeric base layer, and (2) a barrier layer in direct contact with one side of the base layer, the barrier layer comprising a dispersion of organic polymers
   in which the dispersion of organic polymers consists of (i) about 1-98.5 wt. % of polyvinyl butyral, and (ii) a complementary amount to total 100 wt. % of a water soluble organic polymer selected from the group consisting of polyvinyl alcohol, ethylene-vinyl alcohol copolymer and a mixture thereof,
   in which the polyvinyl butyral is present in discrete particles of fine particle size dispersed uniformly throughout a continuous matrix of the water soluble organic polymer, and
   in which at least one of the polyvinyl butyral and the water soluble organic polymer is substantially completely crosslinked by a crosslinking agent.

2. The multilayer barrier film of claim 1 in which the crosslinking agent consists essentially of an aldehyde-based crosslinker selected from the group consisting of acetaldehyde, formaldehyde, propionaldehyde, glycolaldehyde, glyoxylic acid, glyoxal, glutaraldehyde, paraformaldehyde and a mixture thereof.

3. The multilayer barrier film of claim 2 in which the cross linking agent is glyoxal.

4. The multilayer barrier film of claim 1 in which the base layer comprises a polymer selected from the group consisting of polyester, polylactic acid, polyolefin and a blend thereof.

5. The multilayer barrier film of claim 1 in which the weight ratio of polyvinyl butyral to water soluble organic polymer in the barrier layer is in the range of 0.0017 to 0.143.

6. The multilayer barrier film of claim 1 in which the barrier layer is a dehydrated composition of an aqueous dispersion comprising 0.025 to 1 wt % polyvinyl butyral.

7. The multilayer barrier film of claim 1 in which the polyvinyl butyral is substantially completely crosslinked by a crosslinking agent.

8. The multilayer barrier film of claim 1 in which the polyvinyl butyral and the water soluble organic polymer are both substantially completely crosslinked by a crosslinking agent.

9. The multilayer barrier film of claim 1 in which the barrier layer consists of the dispersion of organic polymers, a crosslinking agent and a surfactant.

10. The multilayer barrier film of claim 1 in which the barrier layer further comprises inorganic particles mixed with the dispersion of organic polymers.

11. The multilayer barrier film of claim 1 in which the barrier layer further comprises about 0.5 to about 1 wt. % of a surfactant.

12. The multilayer barrier film of claim 1 which has an oxygen transmission rate less than about 0.119 cm$^3$/100 cm$^2$/day and a moisture vapor transmission rate less than about 15.5 mg/100 cm$^2$/day.

13. A multilayer barrier film having water vapor and oxygen transmission resistant properties, the multilayer barrier film comprising (a) a base layer consisting essentially of polypropylene and (b) a primer layer of polyethyleneimine in direct contact with one side of the base layer, and (c) a barrier layer in direct contact with a side of the primer layer opposite the base layer, the barrier layer comprising a dispersion of organic polymers consisting of (i) about 1-98.5 wt. % of polyvinyl butyral, and (ii) a complementary amount to total 100 wt. % of a water soluble organic polymer selected from the group consisting of polyvinyl alcohol, ethylene-vinyl alcohol copolymer and a mixture thereof,
   in which the polyvinyl butyral is present in discrete particles of fine particle size dispersed uniformly throughout a continuous matrix of the water soluble organic polymer, and
   in which at least one of the polyvinyl butyral and the water soluble organic polymer is substantially completely crosslinked by a crosslinking agent.

* * * * *